(No Model.)

F. H. HAMBLETON.
VALVE OR COCK.

No. 580,940. Patented Apr. 20, 1897.

Witnesses.
Dan'l Fisher
H. MacCarthy.

Inventor
Francis H. Hambleton
by
Benjamin Price
Atty

UNITED STATES PATENT OFFICE.

FRANCIS H. HAMBLETON, OF BALTIMORE, MARYLAND.

VALVE OR COCK.

SPECIFICATION forming part of Letters Patent No. 580,940, dated April 20, 1897.

Application filed June 12, 1896. Serial No. 595,237. (No model.)

*To all whom it may concern:*

Be it known that I, FRANCIS H. HAMBLETON, of the city of Baltimore and State of Maryland, have invented a new and useful Improvement in Valves or Cocks, whereby the same may be sealed and by means whereof any tampering with said valve or cock may be detected, of which the following is a specification.

The accompanying drawings illustrate the invention, of which—

Figure 1:
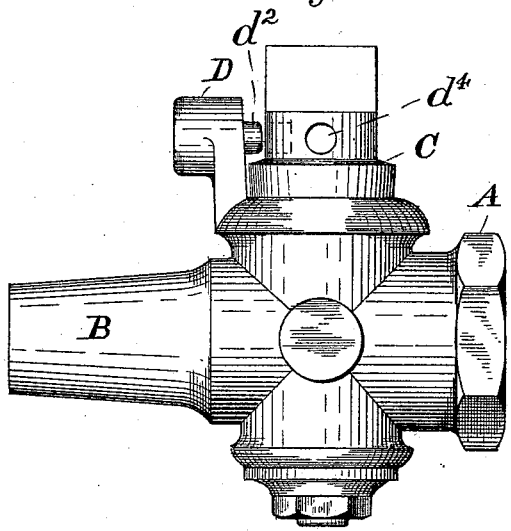
Figure 2:
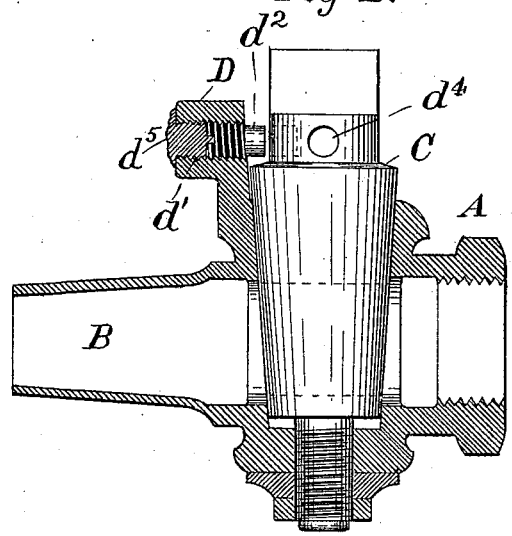
Figure 3:
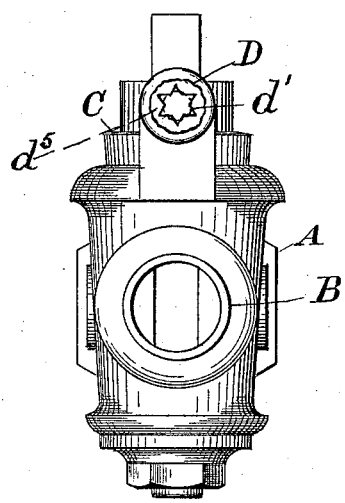
Figure 4:
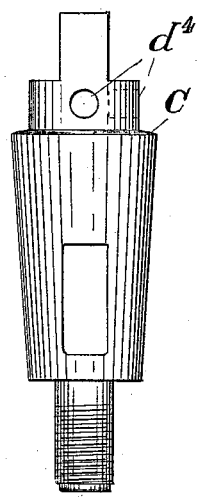

Figure 1 is a side view of an ordinary plug-valve, showing the projection above the casing to accommodate the safety bolt or pin. Fig. 2 is a side view of the same, showing the shell or barrel in section, the shoulder on the valve-plug, and the safety-pin extending above the shoulder. Fig. 3 is a front view of the structure when put together, showing the end of the plug and the sealing in the bolt-aperture. Fig. 4 is a view of the plug of the valve, showing the socket in the upper part to receive the locking-pin.

In the drawings, A is the usual coupling, provided with its usual connecting-screw, and B is an extension on the other side of the valve which may be soldered or otherwise secured to a pipe. The valve-plug is provided with a shoulder C. Above the shell or barrel projects a lug D, which is provided with an aperture $d'$, into which is placed a bolt or pin $d^2$. When the valve-plug is in its place in the valve, the pin $d^2$ is projected until its end overlaps the shoulder C of the valve-plug, and when thus arranged the plug may be turned to open or close the valve, but cannot be taken out unless the bolt $d^2$ is withdrawn, and in order to prevent tampering with this bolt the aperture $d'$ is sealed behind the bolt with sealing-wax or other suitable sealing material $d^5$, which must be broken before the bolt can be withdrawn and when broken will indicate at once that the bolt has been tampered with.

The above construction makes a sealed valve and is useful for a number of purposes. For example, when the ordinary cock is placed on a pipe at the entrance to a gas-meter it is not difficult to remove the plug and put in another, which will change the flow of the gas from its legitimate course through the gas-meter to a pipe located on the other side thereof leading into the premises, and thus enable one so disposed to use the gas from the main without passing through the meter. Should such a device be employed with a cock constructed as above described, the seal would have to be broken, and this would lead to detection.

My improvement also extends to devices whereby the valve-plug may be fixed and retained in an open or closed position, and in connection with the features above described I have suitably placed in the top of the plug a socket $d^4$ so adjusted as to register with the end of the bolt, in order that the same may enter the socket and hold the valve in place in any desired position.

What I claim, and desire to secure by Letters Patent, is—

1. In a plug-valve, substantially as described, the combination of a plug provided with a shoulder located above the casing, a casing provided with a projection located opposite the shoulder on the plug, an adjustable bolt located in the projection arranged to extend over the shoulder or be withdrawn therefrom, and means for sealing the bolt in the projection whereby the valve may be free to be adjusted downwardly, prevented from removal and be turned at will.

2. In a plug-valve, substantially as described, the combination of a casing provided with a projection above its top, a plug provided with a shoulder above the casing and opposite the projection from the casing, an adjustable bolt located in the projection arranged to extend over the shoulder or be withdrawn therefrom, means for sealing the bolt in the projection to thereby prevent tampering therewith, and devices for taking up the wear of the parts and holding the plug in position.

3. The combination with a plug-valve substantially as described, of a casing provided with a projection, a plug for the valve provided with a shoulder, an adjustable bolt located in the projection from the casing, arranged to extend over the shoulder on the plug and be withdrawn therefrom, means for sealing the bolt in the projection, and a series of sockets to accommodate the end of the bolt located in the upper part of the plug, whereby the valve-plug may be locked in any desired position and be prevented from unlocking, without breaking the seal.

Signed at Baltimore city, in the State of Maryland, this 11th day of June, A. D. 1896.

FRANCIS H. HAMBLETON.

Witnesses:
JOHN W. HALL,
JOHN L. HEBB.